July 14, 1942.  F. J. MALONE  2,289,583
TOOL HOLDER
Filed Jan. 9, 1941  2 Sheets-Sheet 1
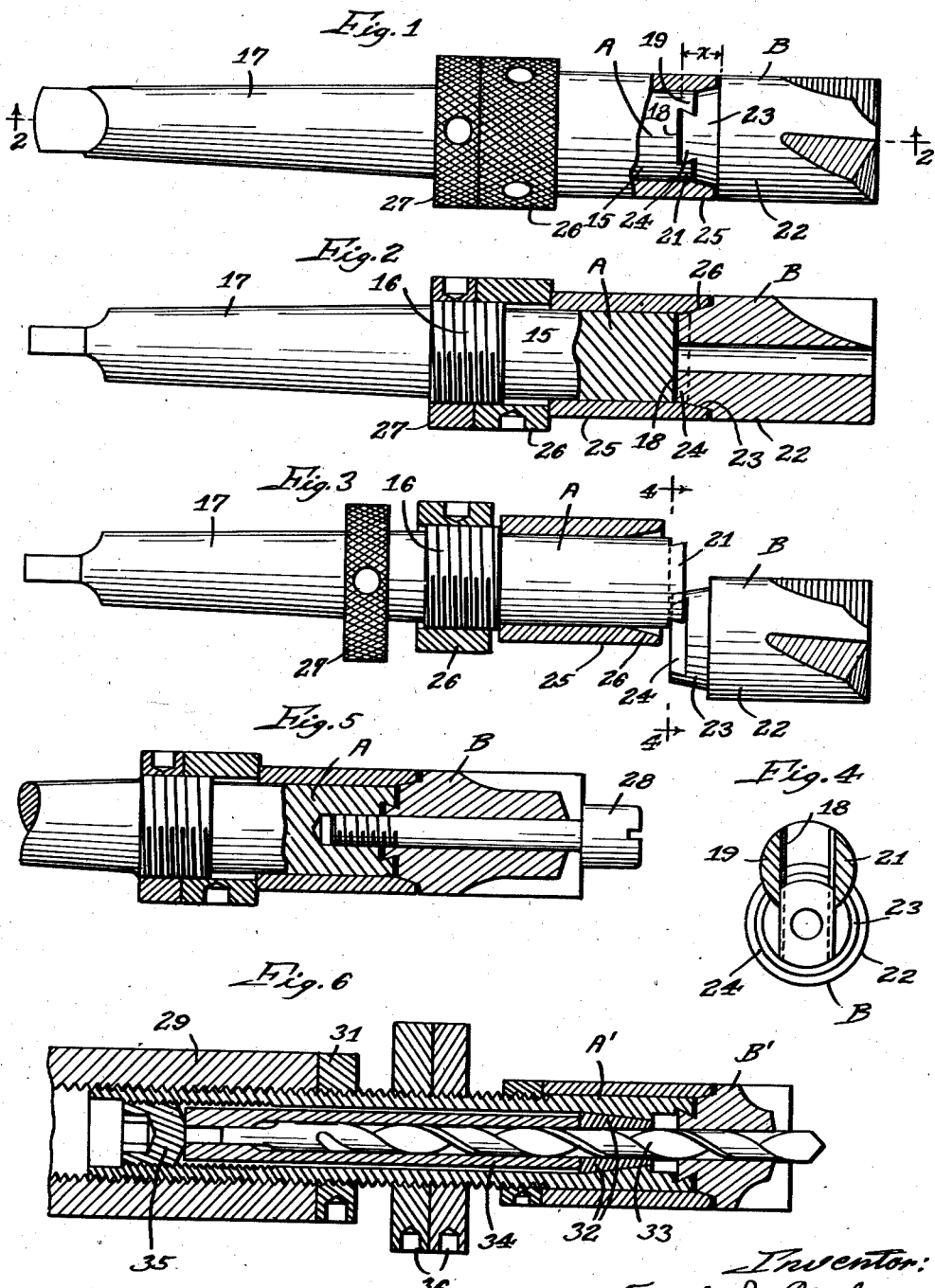
Inventor:
Frank J. Malone
By
McCanna, Wintercorn & Marabach
Attys.

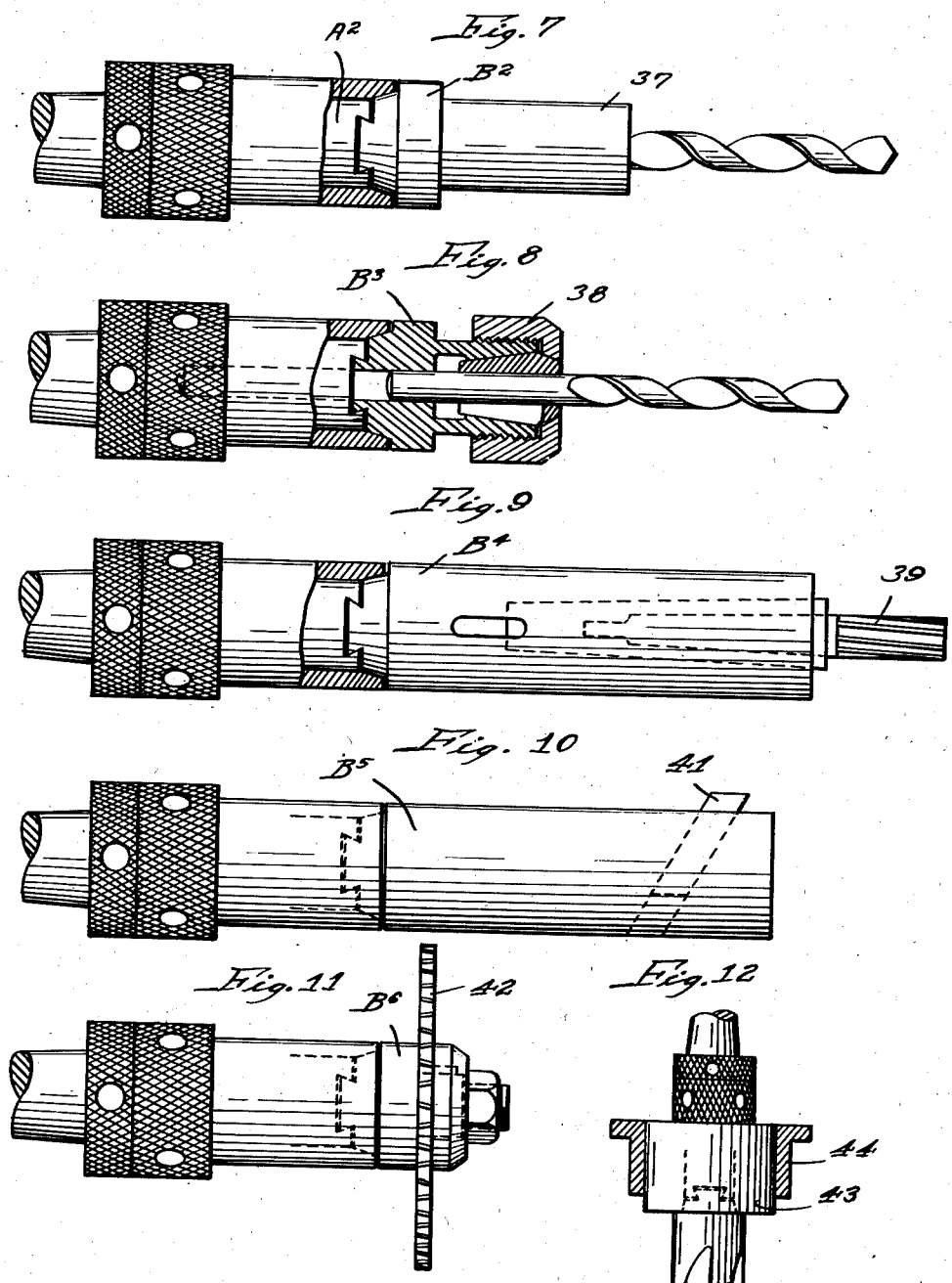

Patented July 14, 1942

2,289,583

UNITED STATES PATENT OFFICE 2,289,583

TOOL HOLDER

Frank J. Malone, Canton, Ohio

Application January 9, 1941, Serial No. 373,753

7 Claims. (Cl. 287—104)

This invention relates to tool holders of the kind adapted for use in metal working machines such as milling machines, drilling and boring machines, shapers and planers, lathes, and others.

In this art the practice is well known of using tool holders especially designed for interchangeable use of tools and cutters, the tool or cutter part having connection with the tool holding or driving part through the intermediary of a so-called interchangeable drive. The prior drive structures are not, however, entirely satisfactory. Invariably such prior structures are limited in their capacity or adaptability to certain types or classes of cutters or certain types of operations. Also, such prior structures inherently involve intricate parts and shapes which necessitate not only a high material cost, but also machining operations that are difficult and costly because of the nature of the operations and the precision required in the performance of such operations. Furthermore, some prior structures are inimical to sustained accuracy in performance, particularly under heavy loads and they are subject to breakage, wedging, and disalignment. Also, some prior structures are not readily interchangeable because they involve a multiplicity of more or less complicated parts. And in some the parts are liable to be sheared or distorted with the result that the holder is apt to be short-lived or to require unusually high repair and replacement.

The primary object of the present invention is, therefore, to provide a generally improved tool holder of the interchangeable cutter type, with a view to advancing this art.

Another object is to provide a simple and novel drive structure in a tool holder of the character described whereby to increase the range of usefulness of tool holders of this kind.

Another object is to provide an improved centering and torque-transmitting drive structure.

Another object is to provide an improved cutter or class of cutters adapted for interchangeable use in a tool holder.

My invention contemplates a unique drive structure which gives new results in this art, including the following:

(1) Full power of the drive is transmitted close to the cutting edge of the tool or to the work application, thereby reducing chatter;

(2) A stronger and more durable drive coupling for a given size, thereby permitting greater power application and the avoidance of breakages such as are apt to occur with prior structures under heavy loads;

(3) Better tool performance and a higher degree of accuracy for precision work;

(4) Relatively short axial length of drive means enables saving in cost of high speed steel;

(5) Novel shape characteristics permit simplicity of machine operations in the manufacture of the tool holder and particularly the drive structure, comprising such operations as turning, grinding, and broaching, thus further reducing the cost of manufacture;

(6) Driving and driven elements are centralized and reinforced in their locked relation by a locking collar, promoting greater strength and accuracy;

(7) Quick and easy interchange of tools with definitely assured concentricity of parts and without the necessity of special checking and resetting for accuracy;

(8) Ready adaptability for standardization for a wide range of uses, including cutting tools for machines such as milling, boring, drilling, turning, shaping, planing, and the like.

(9) The locking collar has the new function of serving as a guide in a tool or fixture bushing and the collar may be readily designed as to exterior size to accommodate bushing sizes; and

(10) Greater versatility for many jobs in machine shop practice.

Other objects and attendant advantages will be appreciated by those skilled in the art as the invention becomes better interested by reference to the following description when considered in connection with the accompanying drawings, in which—

Figure 1 is a side elevation partly in section of a tool holder with a counterbore cutter, embodying my invention;

Fig. 2 is a sectional view substantially on the section line 2—2 of Fig. 1;

Fig. 3 is a similar section with the parts partially disassembled;

Fig. 4 is a cross section taken on the section line 4—4 of Fig. 3;

Fig. 5 is a counterbore similar to Fig. 1, equipped with a pilot;

Fig. 6 is a longitudinal section through a combination adjustable drill and counterbore, embodying my invention;

Fig. 7 shows an application of my invention as a drill holder;

Fig. 8 shows my invention applied as a chuck holder for drills, reamers, and similar tools;

Fig. 9 shows an application as an extension tool holder;

Fig. 10 shows an application as a holder for a boring bar;

Fig. 11 shows an application as a holder for a saw or similar milling cutter; and Fig. 12 shows my invention applied in a jig bushing.

In the preferred embodiment of my invention the novel driving means is of relatively small axial length designated in Fig. 1 by the dimension "X." This driving means serves to transmit driving torque between a driving member A and a driven member B and also to establish an interchangeable coupling between these members and to accurately center and align the members. In this embodiment the member A comprises a cylindrical body portion 15, and exteriorly threaded portion 16 and a taper shank 17. In a tool holder of this kind the shank may be straight instead of taper, according to the machine use. In the terminal end of the cylindrical portion 15 I machine a dovetail groove 18 extending diametrically through from side to side forming drive segments 19 and 21. The member B, the cutting tool in this instance, having a cylindrical body portion 22 of greater diameter than the body portion 15, is reduced at its end opposite from the cutting end to provide a taper portion 23 and a terminal end portion 24 in the form of a male dovetail extending diametrically from side to side of the taper portion and shaped to have a close fit in the dovetail groove 18. A collar 25 having a sliding fit on the cylindrical portion 15 is shaped at its outer end to provide a taper socket 26 complemental to the taper 23 and adapted to be forced against the taper 23 to perform the functions (1) centering the member B with respect to the member A, (2) forcing the dovetail bevels into solid driving contact, (3) circumferentially confining the drive segments 19 and 21, and (4) positively locking the drive elements in a solid and rigid coacting assembly. It will be observed that the collar 25 performs the function of circumferentially embracing and confining the relatively large peripheral surface of the segments 19 and 21, thereby to prevent spreading or distortion of these drive parts under heavy torque loads. The collar may be forced home by any suitable means such as a nut 26 threaded on the portion 16. A lock nut 27 may be used to lock the nut 26 in its set position, although this lock nut is not essential.

To disassemble the parts for the purpose of removing the cutter B, the nut 26 will be backed off sufficiently to allow the collar 25 to be slid back to withdraw its outer end portion clear of the dovetail joint, as shown in Fig. 3. The cutter B is then free to be slid crosswise in the plane of the dovetail groove to withdraw the male dovetail.

It will be observed that the parts constituting the drive means have shape characteristics requiring only simple and ordinary machining operations such as turning, grinding, and broaching. This, together with the relatively short axial length of the drive parts, permits of manufacture at a comparatively low cost.

It will be further observed that because of the shape characteristics of the drive parts they are capable of embodiment in a form giving exceptional strength and compactness considering the functions performed.

My invention contemplates the application of this drive means in numerous applications, some of which I believe are, in themselves, new in the art.

In Fig. 5 I have shown the application of a pilot 28 to the counterbore cutter B. The use of pilots of this type is well known, but invariably in the prior art these pilots impose structure limitations or additional structure and in some drives they are prohibitive.

In Fig. 6 I have shown a novel application of my invention consisting of a combination adjustable drill and counterbore, in which each tool is independently adjustable. Here, the counterbore cutter B' has interchangeable drive connection with a holder in the form of an adjusting sleeve designated generally by A'. The drive per se is the same as described above with reference to the parts A and B. In this case, however, the sleeve A' is threadingly adjustable in a drive spindle 29 and locked in adjusted position by a nut 31. Within the outer end portion of the sleeve just behind the drive connection is a suitable collet chuck including collets 32 designed to grip and drive a tool such as the twist drill 33. The collets are forced into locking position by an extension sleeve 34 which is forced into locking position by a nut 35 threaded in the bore of the sleeve A' 34. Stop collars 36 providing a stop limit for the counterbore are not essential but they serve an obvious purpose. My invention here provides a novel tool holder in which the counterbore and the drill are independently adjustable.

Further applications of my invention are shown in Figs. 7 to 11, inclusive. In Fig. 7 the tool or cutter part B² has an extension 37 for carrying a twist drill. The drive structure for interchangeable connection of the cutter member B² to the holder A² is as above described. Fig. 8 shows another type of collet chuck 38 applied to the cutter member B³. Fig. 9 shows an interchangeable member B⁴ in the form of an extension bar having a tool socket for any of a variety of tools such as a reamer 39. Fig. 10 shows a member B⁵ in the form of a boring bar carrying a boring cutter 41. Fig. 11 shows a member B⁶ designed for holding a saw type cutter 42, or any standard or special cutter adapted for a short arbor mounting. In all of these applications, Figs. 7 to 11, inclusive, the interchangeable drive parts are similar to my improved drive above described.

My invention is adapted for many other applications too numerous to illustrate. It is, however, particularly advantageous and beneficial in this art as applied in a jig bushing as shown in Fig. 12. Here the locking collar 43 corresponds with the collar 25 above described except that the diameter has been enlarged to fit the jig bushing 44. With a tool holder embodying my invention the locking collar may readily be designed to any desired outside diameter or length for use as a rotary guide or pilot in fixtures having tool bushings of this type. Where changes or new requirements of this kind occur, it is not necessary with my invention to furnish an entirely new tool or cutter holder, or set of such holders, but instead only a new clamping collar of the desired outside dimensions need be provided. This, I believe, is a distinct advance in the art.

It should be observed that in practice the dovetail parts may be reversed, that is, with the groove 18 in the part 22 instead of the part 15 and the male dovetail 24 in the part 15 instead of the part 22, although I prefer the arrangement shown in the drawings. The claims should, therefore, be so interpreted.

It will be manifest to those skilled in this art that my invention is capable of broad application within the scope of the appended claims, in which—

I claim:

1. A tool holder comprising a drive member having a dovetail groove in one end, a tool member having a taper end portion terminating in a male dovetail portion fitting in said dovetail groove, and a locking collar on the drive member having a taper socket coacting with the taper portion of the tool member to center and lock the tool member with respect to the drive member.

2. An interchangeable drive for tool holders comprising a cylindrical tool holder body having a reduced annular taper end adapted to function as a centering medium and terminating in a further reduced portion shaped to provide a transverse male dovetail adapted to function as a torque-transmitting medium, a drive member of outer diameter not exceeding that of the small end of said taper portion, the drive member shaped at one end to provide a transverse dovetail groove adapted to receive said male dovetail in torque-transmitting coaction therewith, a collar on said drive member circumscribing the dovetail portion and terminating in a portion having a taper socket fitting the taper portion of the tool holder member to center the latter with respect to the drive member.

3. An interchangeable drive for tool holders comprising a cylindrical tool holder body having a reduced annular taper end adapted to function as a centering means and terminating in a further reduced portion shaped to provide transverse faces adapted to function as a torque-transmitting means, a drive member of outer diameter not exceeding that of the small end of said taper portion, the drive member shaped at one end to provide transverse faces adapted to coact with said transverse faces on the tool holder body, a collar on said drive member circumscribing the torque-transmitting portion and terminating in a portion having a taper socket fitting the taper portion of the tool holder member to center the latter with respect to the drive member.

4. An interchangeable drive for tool holders characterized by the relatively short overall axial length of its coupling and drive transmitting parts, comprising a driving member, a driven member, one of said members having a relatively short taper end portion terminating in a transverse male dovetail, the other member having a transverse dovetail groove adapted to receive the male dovetail, said dovetail serving to transmit torque from one member to the other, and a locking collar on the second mentioned member having a taper socket at one end adapted to fit the taper end of the first mentioned member to center and lock said members one with respect to the other.

5. An interchangeable drive for metal working tool holders characterized by the relatively short overall axial length of its coupling and drive transmitting parts, comprising a drive member, a driven member, one member terminating at its coupling end in a transverse male dovetail and the other having a transverse dovetail groove, said dovetail parts providing a torque-transmitting connection between said members, one of said members having an annular taper end portion at its coupling end, a locking collar on the other member having a taper socket at one end complemental to the taper of said taper end portion, and means to force the locking collar axially against said taper end portion to center and lock said members one with respect to the other.

6. An interchangeable drive for metal working, precision tool holders, having, in combination, a driving member and a driven member adapted to be detachably connected one to the other, one member having a transverse dovetail at its connected end, the other member having a transverse dovetail groove at its connected end shaped for coaction with the male dovetail, said dovetail parts providing a torque-transmitting engagement, and means for both centering and locking said members in said torque-transmitting engagement comprising a taper end portion on one member circumferentially of and in proximity to its torque-transmitting part, a collar having a sliding fit on the other member and having a taper end face portion in coaction with the first mentioned taper end face portion, and means for forceably clamping the collar taper face and the member taper face relatively one against the other to accurately center said members through said taper end faces and to lock them in torque-transmitting connection to said dovetail.

7. An interchangeable drive for metal working tool holders characterized by the relatively short overall axial length of its coupling and drive transmitting parts, comprising a drive member, a driven member, one member terminating at its coupling end in transverse torque-transmitting faces, the other member having transverse faces in coaction with said torque-transmitting faces, said transverse faces shaped to provide a torque-transmitting connection between said members, one of said members having an annular taper end portion at its coupling end, a locking collar on the other member having a taper socket at one end complemental to the taper of said taper end portion, and means to force the locking collar axially against said taper end portion to center said members one with respect to the other and to lock them in rigid coacting relation.

FRANK J. MALONE.